United States Patent [19]

Wharam

[11] 4,083,472
[45] Apr. 11, 1978

[54] TAPE CARTRIDGE WITH HINGED HOUSING SECTIONS

[75] Inventor: John L. Wharam, Eagan, Minn.

[73] Assignee: Minnesota Mining and Manufacturing Company, St. Paul, Minn.

[21] Appl. No.: 637,816

[22] Filed: Dec. 4, 1975

[51] Int. Cl.² .................... B65D 43/14; G11B 23/02
[52] U.S. Cl. .................................. 220/334; 360/132; 242/197; 206/393
[58] Field of Search ............ 220/334, 337, 341, 343, 220/1 A; 206/387, 389, 391, 393, 403; 242/71.1, 197, 198, 199, 200; 360/132

[56] References Cited

U.S. PATENT DOCUMENTS 3,756,329  9/1973  Dolby .................. 242/197 X

Primary Examiner—William Price
Assistant Examiner—Steven M. Pollard
Attorney, Agent, or Firm—Cruzan Alexander; Donald M. Sell

[57] ABSTRACT

An improved video tape cartridge having a housing formed in two sections that are pinned together at two hinged knuckle joints by means of removable hinge pins. Each knuckle joint is defined by knuckle members formed on each housing section. Each hinge pin is shaped with a long bent end portion that is directed through one of the knuckle members to be journaled in an aperture in the other of the knuckle members, and an opposite end portion that is held in place by a rib near such other knuckle member.

3 Claims, 3 Drawing Figures 4,083,472

TAPE CARTRIDGE WITH HINGED HOUSING SECTIONS

BACKGROUND OF THE INVENTION

1. Field of the Invention

The present invention relates in general to video tape cartridges, and more specifically to such cartridges having housings formed in two hinged sections.

2. Description of the Prior Art

It is known in the art to provide video tape cartridges having housings formed from two hinged sections as described in U.S. Patent to Dolby, No. 3,756,329. The Dolby patent discloses the connection of the two hinged sections together by a U-shaped clip that coacts with knuckle portions formed on the housing sections. The U-shaped clip is bent at its end to form hooks that fit about shoulders by one of the knuckle portions to maintain the clip in proper position. Although the Dolby clip apparently is satisfactory in holding the housing together in this fashion, it is relatively difficult to install and makes assembly and disassembly awkward and highly inconvenient. Accordingly, a need exists for a tape cartridge housing that can be easily and readily assembled.

SUMMARY OF THE INVENTION

The present invention provides a video tape cartridge for housing a pair of tape reels and is formed of two housing sections connected together by at least one knuckle joint that includes an open center male knuckle member protruding from a sidewall of one of said housing sections, a channel shaped female knuckle member formed in the other of said housing section, an abutment rib disposed near one side of said female knuckle member and a resilient hinge pin that connects said knuckle members together. Two sidewalls define the channel shape of the female knuckle member and are each formed with an aperture therethrough. The hinge pin includes a long bent end portion journaled in the apertures of said female knuckle member and the open center of said male knuckle member, and an opposite end portion that is lodged against the abutment rib and is maintained under tension in a partially bent condition to securely hold the pin in a hinge connecting position in the cartridge.

In a preferred embodiment, two knuckle joints are employed and the opposite ends of each of the hinge pins have short bent end portions that are parallel to the long bent end portions but are bent in the opposite direction. Such short bent end portions of the pins are adapted to hook around the end of the abutment ribs to aid in insuring that the pins will be semi-permanently held in the cartridge.

DESCRIPTION OF THE PREFERRED EMBODIMENTS

Figure 1:
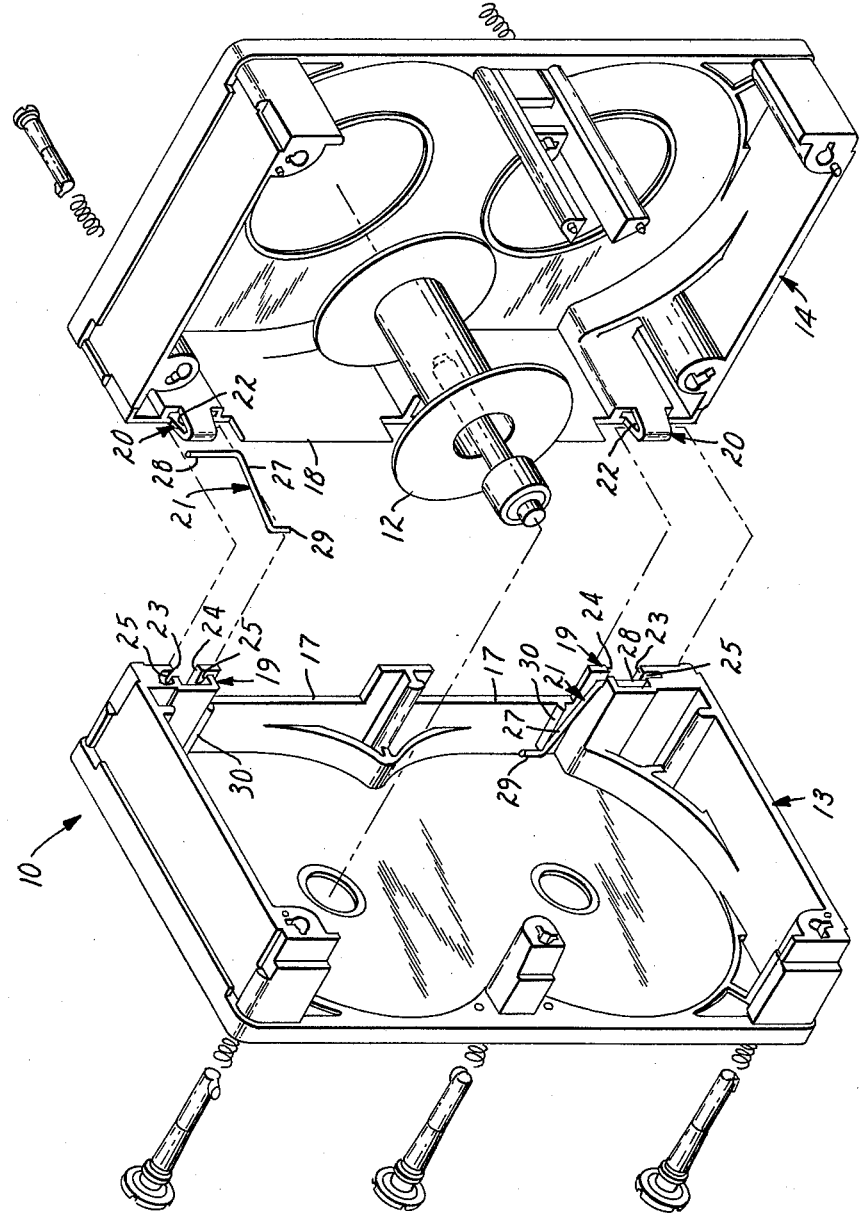
FIG. 1 is an exploded perspective view of a cartridge of the present invention with the two sections of the cartridge housing separated from one another and with only one of two reels of the cartridge shown.

Referring now to the drawings and with reference first to FIG. 1, a preferred embodiment of an improved video tape cartridge 10 of the present invention is shown. The cartridge 10 includes a plastic molded housing that is adapted to store two tape reels 12 (only one of which is shown for purposes of clarity) in a side-by-side, parallel relationship. The housing is formed from substantially two equally sized rectangularly shaped sections 13 and 14 that are hingedly connected together. The cartridge 10 resembles the cartridge described in U.S. Pat. No. 3,756,329, issued Sept. 4, 1973, incorporated herein by reference. The major difference between the cartridge of the present invention and that described in the aforementioned patent is the manner in which the two housing sections 13 and 14 are hinged together, and such difference will become more apparent from the following description.

Figure 2:
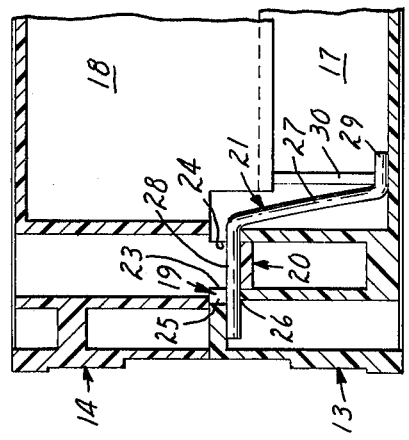
FIG. 2 is a cross sectional view of one of the knuckle joints that hold the two sections of the cartridge housing together, which knuckle joint is formed from male and female knuckle members, an abutment rib and a hinge pin that is shown secured in its normal position in the housing.
Figure 3:
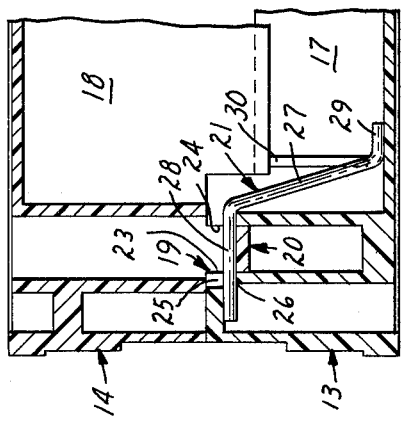
FIG. 3 is a cross sectional view of the knuckle joint of FIG. 2, but with the lower end portion of the hinge pin dislodged from a secured position.

The housing sections 13 and 14 each respectively include a back wall 17 and a back wall 18. The back wall 17 of the section 13 has two female knuckle members 19, and the back wall 18 of the section 14 has two male knuckle members 20, which knuckle members are held together by resilient hinge pins 21 to form knuckle joints. Each male knuckle member 20 is in the form of a U-shaped lobe having an open center 22 and each is positioned at the edge of the back wall 18 to protrude therefrom. Each female knuckle member 19 is formed in the shape of an outwardly facing channel for receiving a corresponding knuckle member 20. Sidewalls 23 and 24 define the members 20 and have V-shaped notches 25 in which the hinge pins 21 are adapted to be positioned. Although the V-shape of the notches 25 is preferable, such shape is not essential to the present invention and other types of apertures having different notch shapes or in the form of holes may be employed in substitution. As best shown in FIGS. 2 and 3, a port 26 is also formed in the sidewall 23 at the base of the notch 25 therein for a purpose to be described below.

The hinge pins 21, as shown in FIG. 3, normally have a straight body portion 27 and end portions that are bent in opposite directions to form a long bent end portion 28 and a short bent end portion 29. Only the long bent end portions 28 serve to pivotally fasten the two knuckle members 19 and 20 together. The remainder of each pin 21 is employed to semi-permanently secure the pins 21 in proper position in the cartridge 10. Such securement is accomplished by the use of two ribs 30 that are equally spaced from the midpoint of the housing back wall 17 to lie near one side of and spaced apart from each of the knuckle members 19. The ribs 30 serve as abutment means against which the short bent end portions 29 of the pins 21 are lodged and hooked around, as shown in FIG. 2.

To insert one of the pins 21 into the cartridge 10, first the two housing sections 13 and 14 are brought adjacent to one another, with the knuckle members 20 positioned into the knuckle members 19. Then the long bent end portion 28 of one of the pins 21 is directed through the V-shaped notch 25 in the sidewall 24 of one of the knuckle members 19 and through the center 22 of the corresponding member 20 to extend into the V-shaped notch in the corresponding sidewall 23 and the port 26 formed therein. Such insertion places the pin 21 in the position shown in FIG. 3. Next, the short bent end portion 29 of the inserted pin 21 is lodged against the adjacent rib 30 by exerting sufficient pressure on the lower bent end portion 29 of the inserted pin 21 to bend its body portion 27 toward the adjacent knuckle member 19 until the bent end portion 29 hooks around the lower end of the adjacent rib 30.

Once the short bent end 29 is lodged against the end of the rib 30 in the above fashion, bending pressure on the pin 21 may be released and the resiliency of the pin 21 causes the pin to attempt to return to its normal shape. However, the rib 30 on which the pin 21 is lodged prevents the pin 21 from fully returning to its normal shape to thereby maintain the pin under tension in a partially bent condition. Both of the pins 21 may be readily positioned into place in this manner and once in place they are semi-permanently held therein to form reliable solid connections between the two housing sections 13 and 14. Furthermore, such connections between the two housing sections 13 and 14 have the capability of flexing while maintaining a close fit of the housing sections along the hinged edge.

Although the pins 21 have been shown and described as having a short bent end portion 29, such shape is not essential to the present invention. Instead, the pins 21 may terminate in a straight end that is lodged against the ribs 30. However, the use of bent end portions 29 that hook around the ribs 30 is highly preferable, as the bent end portions 29 insure that the pins 21 will not unintentionally become dislodged from the ribs 30.

What is claimed is:

1. A video tape cartridge that includes a housing for a pair of spaced apart reels in a parallel relationship to one another, which housing is formed of a first housing section and a second housing section that are connected together by at least one knuckle joint comprising:
   a male knuckle member that has an open center and protrudes from the sidewall of one of said housing sections;
   a channel shaped female knuckle member formed in a sidewall of the other of said housing sections to receive said male knuckle member, said female knuckle member having two sidewalls that each include an aperture therethrough;
   an abutment spaced apart from said female knuckle member in a position adjacent one of its sidewalls with at least a portion of said abutment offset from the apertures in the sidewalls of said female knuckle member;
   a hinge pin having one terminal end portion extending through the open center of said male knuckle member and journaled in the apertures of said female knuckle member and an opposite terminal end portion lodged against the offset portion of said abutment in such fashion that said pin is maintained under tension in a partially bent condition to securely hold said pin in position connecting said knuckle members together.

2. A tape cartridge as recited in claim 1 wherein said opposite terminal end portion is bent and hooked about said abutment.

3. A tape cartridge as recited in claim 1 wherein the apertures of said female knuckle member sidewalls include a V-shaped notch in each sidewall and a port at the base of one of said notches, and said one terminal end portion of said hinge pin extends through said port.

* * * * *